Patented Apr. 29, 1930

1,756,100

UNITED STATES PATENT OFFICE

ERICH RICHTER, OF BITTERFELD, GERMANY, ASSIGNOR TO I. G. FARBENINDUSTRIE AKTIENGESELLSCHAFT, OF FRANKFORT-ON-THE-MAIN, GERMANY

PROCESS FOR PREPARING COLORED NITROCELLULOSE VARNISHES

No Drawing. Application filed April 14, 1927, Serial No. 183,894, and in Germany February 1, 1926.

The present invention relates to colored nitrocellulose varnishes and to a process of preparing the same.

The difficulties to be met in the manufacture of colored nitro-cellulose varnishes are well-known. When a soluble dyestuff is used the covering power of the solution is not sufficient for most applications. The coloring matters applicable have been organic dyestuffs, the majority of which are decomposed by the action of light under the oxidizing influence of the nitro-cellulose.

When covering varnishes are required insoluble pigments must be used. Such pigments, however, are not sufficiently finely distributed in the nitro-cellulose by the mechanical grinding processes hitherto usual and they have the disadvantage that the varnish lacks smoothness and high lustre; moreover, on long standing of the varnish the pigments settle therein.

Furthermore, these colored varnishes, particularly when they contain several components, have the disadvantage that unless the varnish is particularly well stirred it is liable to show varying color tints.

These variations are produced either when stirring the pigment into the nitro-cellulose solution, or in the case of varnish composed of mixed solutions, when adding the pigment to one part, for instance in the case of mixed rosin and nitro-cellulose varnishes to the rosin solution, and using this in making the final varnish solution.

According to the present invention the coloring matter is incorporated with the nitrocellulose, not after the latter has been dissolved but at an earlier stage in the manufacture. The mineral or organic insoluble coloring matter is intimately mixed, with addition of water, with the nitro-cellulose wet with water, the mixing being performed in a suitable apparatus, such as a Kollergang or kneading machine, until a homogeneous magma is produced. The duration of the grinding varies, being dependent upon the original degree of fineness and the nature of the pigment. The grinding is stopped when a sample, after drying and dissolution in an organic solvent, shows the desired degree of dispersion of the pigment. The homogeneous magma is then pressed, freed from water by extraction or heat and dissolved in the usual varnish solvents. The varnish thus obtained contains the pigment in colloidal form, shows the characteristic features of a colloidal solution and has the following advantages as compared with varnishes hitherto made, which are only suspensions.

1. The coloring matter does not deposit even after the varnish has been stored for a long time.
2. Coatings produced by means of the varnish are smooth, lustrous, clear by transmitted light and of good covering power by reflected light.
3. For obtaining a given color tone a considerably smaller proportion of coloring matter is necessary than has hitherto been the case.
4. The varnish is fast to light.

Coatings made with varnishes produced in the manner described above do not show any individual particles of color when examined under a microscope, whereas in varnishes hitherto made the separate color particles can generally be detected by the naked eye and are always recognizable with the lens.

Since the manufacture of nitro-cellulose involves a grinding process of the raw material obtained wet with water and showing the fibrous form of the cellulose used as starting material, the process of the present invention is of advantage in that the incorporation of the color takes place simultaneously with the grinding of the nitro-cellulose.

The following examples illustrate the invention, the parts being by weight:—

*Example 1.*—450 parts of nitro-cellulose containing 35 per cent of water are mixed in a disintegrator with 35 parts of chrome yellow in 2000 parts of water until a sample, when dried and dissolved in acetone, shows that the pigment has passed into colloidal solution. The colored nitro-cellulose is dried and dissolved in a mixture of organic solvents.

*Example 2.*—450 parts of nitro-cellulose containing 35 per cent of water are ground in a Kollergang with 20 parts of fast Bordeaux red in 1500 parts of water until a sample, after having been dried and dissolved in acetone, shows that the dyestuff has passed into colloidal solution. The water in the colored nitro-cellulose is extracted by means of alcohol and the nitro-cellulose wet with alcohol is then dissolved in a mixture of organic solvents.

In the following claims the term "an indifferent liquid" is intended to mean a liquid incapable of dissolving nitrocellulose, and the term "highly-volatile liquid solvent" is intended to include only such solvents as substantially completely volatilize from the lacquer film after application.

Having now particularly described and ascertained the nature of my said invention and in what manner the same is to be performed, I declare that what I claim is:—

1. The process for preparing colored nitrocellulose varnishes which consists in intimately grinding fibrous nitrocellulose with an insoluble coloring matter in the presence of an indifferent liquid until a homogeneous magma is produced, freeing the same from the indifferent liquid and treating it with a highly-volatile liquid solvent for nitrocellulose, whereby the nitrocellulose is dissolved, the coloring matter being dispersed in colloidal form throughout the solution.

2. The process for preparing colored nitrocellulose varnishes which consists in intimately grinding fibrous nitrocellulose with an insoluble coloring matter in the presence of water until a homogeneous magma is produced, freeing the same from water and treating it with a highly-volatile liquid solvent for nitrocellulose, whereby the nitrocellulose is dissolved, the coloring matter being dispersed in colloidal form throughout the solution.

In testimony whereof I have affixed my signature.

Dr. ERICH RICHTER.